A. T. & A. R. TITUS.
EXHAUST FOR GAS ENGINES.
APPLICATION FILED APR. 25, 1911.
1,038,685.  Patented Sept. 17, 1912.
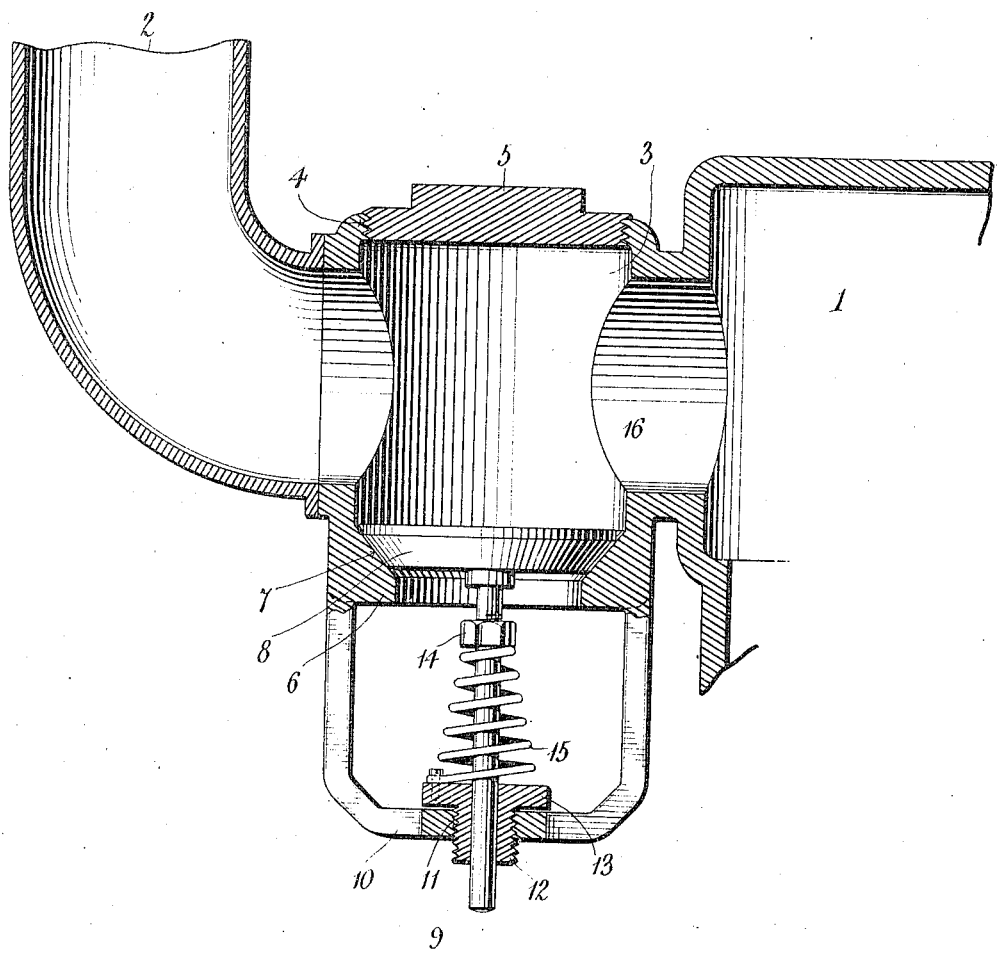
Inventors
Albert T. Titus and
Albert R. Titus

UNITED STATES PATENT OFFICE.

ALBERT T. TITUS AND ALBERT R. TITUS, OF ROBBINSDALE, MINNESOTA.

EXHAUST FOR GAS-ENGINES.

1,038,685. Specification of Letters Patent. Patented Sept. 17, 1912.

Application filed April 25, 1911. Serial No. 623,220.

*To all whom it may concern:*

Be it known that we, ALBERT T. TITUS and ALBERT R. TITUS, citizens of the United States, residing at Robbinsdale, in the county of Hennepin, State of Minnesota, have invented certain new and useful Improvements in Exhausts for Gas-Engines; and we do hereby declare the following to be a full, clear, and exact description of the invention, such as will enable others skilled in the art to which it appertains to make and use the same.

Our invention relates to new and useful improvements in internal combustion engines and more especially to the exhaust thereof, and the object of our invention is to supply an automatic valve in the exhaust chamber between the exhaust pocket of the engine and a pipe leading to the muffler, said valve to furnish means for supplying cool air to the exhaust valve, said air also cooling and clearing the cylinder for the following charge.

With these and other objects in view our invention will be more fully described, illustrated in the drawings which show a preferred embodiment of our device, and then specifically pointed out in the claims which are attached to and form a part of this application.

In the accompanying drawings, the figure is a central sectional view of our invention.

Referring more specifically to the drawings, in which similar reference numerals designate corresponding parts throughout, 1 designates in general the exhaust pocket of an internal combustion engine of the usual or any preferred type, 2 the exhaust pipe which leads from said chamber to the muffler, and 3 an exhaust chamber formed in said pipe, or secured between said pipe and the exhaust pocket as preferred. The upper portion of this exhaust chamber as shown, is provided with a tapped opening or port 4 which is normally closed by means of the screw threaded plug 5.

The lower portion of the casing of the exhaust chamber is open and provided with the inwardly extending annular flange 6 the upper face of which is beveled as at 7 to form a seat for the disk valve 8. This valve 8 is provided with a valve stem 9 which is reciprocally mounted in a yoke 10 which is formed integrally with the exhaust chamber casing. That portion of the yoke 10 through which the valve stem extends is provided with a tapped bore 11 in which is threaded a nut 12 the inner portion of which is provided with an enlarged head 13. A nut 14 is secured upon the valve stem intermediate between the valve and the adjustable nut 13 and a helical spring 15 surrounds the valve stem and is secured by one end to the nut 13, while its upper end rests against the lower face of the nut 14. This spring 15 is so proportioned that when the valve is in its closed position the spring is compressed and the force of the spring is just insufficient to raise the valve from its seat. As will be readily understood any force tending to raise the valve will be assisted by this spring and therefore by means of this spring but extremely little force is required to open the valve. The strength of the spring may be regulated by means of the adjusting nut 13 to allow for all wear of the parts and to further compress the spring as it becomes weakened from use.

In operation when the exhaust valve of the engine is opened the hot gases rush through the port 16 between the exhaust pockets of the engine and the exhaust chamber, through the exhaust chamber and then out through the exhaust pipe 2 to the muffler, forming a partial vacuum in the exhaust pocket, the exhaust chamber and the exhaust pipe. Atmospheric pressure, assisted by the spring 14, then opens the valve 8 allowing the cool air to rush in and fill this vacuum, thus preventing the hot gases from being forced back into the exhaust chamber of the engine and into the cylinder when the exhaust valve is locked in its open position by action of the governor. Instead of the gases being thus drawn in, cool air is drawn through the valve, cooling the exhaust valve and cooling and clearing the cylinder for the following charge.

As will be readily understood this is an extremely simple device and at the same time one wonderfully effective in its operation.

What we claim is:—

1. The combination with a gas engine and its exhaust pipe, of a vacuum relieving device operable under the influence of suction within said pipe and having means for varying the delicacy of its responsiveness to suction, said device comprising a valve adapted to close by gravity and having a spring arranged to assist in its opening.

2. In a device of the character described, the combination with an exhaust pipe of an engine and the exhaust pocket thereof, of a casing positioned between said pipe and pocket and forming an exhaust chamber, said chamber being provided in its lower wall with a valve seat and with an outwardly extending integrally formed yoke apertured to receive the valve stem, a gravity closing valve in said valve seat and with its stem reciprocally mounted through said yoke, a set nut threaded upon said valve stem between said yoke and valve seat, and a helical spring surrounding the stem and bearing by one end against the yoke and by its other end against the nut, said spring being proportioned to overcome the weight of the valve and the valve stem.

In testimony whereof, we affix our signatures, in presence of two witnesses.

ALBERT T. TITUS.
ALBERT R. TITUS.

Witnesses:
GEORGE O. JOHNSON,
J. H. MORSE.